United States Patent
Wilson et al.

(10) Patent No.: US 10,054,195 B2
(45) Date of Patent: Aug. 21, 2018

(54) MULTIPLE SPEED GEAR BOX

(71) Applicant: Morrison Container Handling Solutions, Inc., Glenwood, IL (US)

(72) Inventors: Nick Wilson, Chicago, IL (US); Cezary Mroz, Dyer, IN (US)

(73) Assignee: Morrison Container Handling Solutions, Inc., Glenwood, IL (US)

( * ) Notice: Subject to any disclaimer, the term of this patent is extended or adjusted under 35 U.S.C. 154(b) by 463 days.

(21) Appl. No.: 14/825,721

(22) Filed: Aug. 13, 2015

(65) Prior Publication Data

US 2015/0345594 A1    Dec. 3, 2015

Related U.S. Application Data

(63) Continuation of application No. 13/692,487, filed on Dec. 3, 2012, now Pat. No. 9,121,473.

(51) Int. Cl.
*F16H 3/02*    (2006.01)
*F16H 3/00*    (2006.01)

(52) U.S. Cl.
CPC .............. *F16H 3/02* (2013.01); *F16H 3/001* (2013.01); *Y10T 74/19065* (2015.01); *Y10T 74/19219* (2015.01)

(58) Field of Classification Search
CPC ................................... F16H 3/02; F16H 3/001
USPC ..................................................... 74/665 GA
See application file for complete search history.

(56) References Cited

U.S. PATENT DOCUMENTS

| | | | | |
|---|---|---|---|---|
| 2,975,656 A | * | 3/1961 | Haverlender | F16H 3/16 74/15.63 |
| 3,026,011 A | * | 3/1962 | Grass | B65H 51/10 226/178 |
| 3,143,004 A | * | 8/1964 | Haskin, Jr. | B65H 16/103 74/385 |
| 3,465,800 A | * | 9/1969 | Michaelis | A47J 43/082 241/101.2 |
| 4,924,689 A | * | 5/1990 | Wilson | B21B 13/005 72/235 |

* cited by examiner

*Primary Examiner* — Ha Dinh Ho
(74) *Attorney, Agent, or Firm* — Quinn IP Law

(57) ABSTRACT

A gear box includes an output shaft defining multiple output drivers and includes a plurality of gear sets having the same diametral pitch. A common input shaft is operatively attached to each of the plurality of gear sets such that the gear sets rotate continuously and concurrently with rotation of the input shaft. Each of the output drivers is operatively attached to the output shaft and rotatably driven by a respective one of the plurality of gear sets. The multiple output drivers share a common axis of rotation with the output shaft. The output speed of the gear box may be changed by disconnecting one of the output drivers from a driven device and reconnecting another one of the output drivers to the driven device. The output speed of the gear box may be changed without having to disengage and/or change out any of the gears in the gear box.

20 Claims, 3 Drawing Sheets

MULTIPLE SPEED GEAR BOX

CROSS-REFERENCE TO RELATED APPLICATION

This application claims the benefit of U.S. application Ser. No. 13/692,487 filed Dec. 3, 2012, which is hereby incorporated by reference in its entirety.

TECHNICAL FIELD

The present invention relates to a multiple speed gear box.

BACKGROUND

A gear box typically includes an input shaft and an output shaft in geared relationship with each other such that rotating speed of the input shaft and the rotating speed of the output shaft are different and defined by the geared relationship. The gear box may be used to drive a device operatively attached to the output shaft at the output rotating speed. A gear box having a single output shaft may be configured as a multiple speed gear box where the output speed of the gear box may be changed from a first rotating speed to a second rotation speed by disengaging and reengaging different combinations of gears in the gear box using a shift lever, selector fork, slidable coupling or clutch to disengage and engage different gears, or by changing out one or more gears from the gear box to change the gear ratio of the gear set connecting the input shaft to the output shaft. These methods for changing the output speed of the gear box require disengagement and reengagement of at least two gears in the gear box, where repeated disengagement and reengagement of gears may result in gear misalignment, wear, reduction of useful life, and/or noise in use.

SUMMARY

A gear box including a single output shaft defining multiple drivers and a method of changing the output speed of the gear box are provided herein. The gear box includes a plurality of gear sets, wherein each of the gear sets includes a driven gear, a driving gear and an idler gear engaged with the driven gear and the driving gear, where the driven gear, driving gear and idler gear of each gear set are in constant engagement in use. A common input shaft is operatively attached to each of the driving gears of the plurality of gear sets such that each of the gear sets are constantly engaged and rotating concurrently during rotation of the input shaft of the gear box. Each gear of the plurality of gear sets has an identical diametral pitch, such that the diametral pitch of each of the driven gears, idler gears and driving gears in the gear box is the same.

The gear box includes a plurality of output drivers, wherein each of the plurality of output drivers is operatively attached to the singular output shaft. Each output driver is rotatably engaged by a respective one of the plurality of gear sets, and each output driver shares a common axis of rotation with each of the other output drivers and the output shaft. Using this method, the output speed of the gear box may be changed by disconnecting a driven device from one of the output drivers and reconnecting a driven device to another one of the output drivers. The output speed of the gear box may be changed without having to disengage and/or change out any of the gears in the gear box. The gear sets may be enclosed by or sealed in a gear housing and the output speed of the gear box may be changed without opening the housing, thereby preventing contamination, incidental damage, and/or misalignment of the plurality of gear sets during changeover of the output speed of the gear box. The output drivers may be configured to differentiate a first output driver rotating at a first speed from a second output driver rotating at a second speed. Differentiating the output drivers may include providing a first type of engageable interface for the first driver and a second type of engageable interface for the second driver.

A method of changing the output speed of the gear box to drive a plurality of different devices at different gear box output speeds includes engaging an initial output driver of the gear box to an initial device to be driven, where the initial output driver is one of the multiple output drivers defined by the output shaft of the gear box. The initial output driver is configured to drive the connected driven device at an initial output speed corresponding to the initial output driver. The method continues with disengaging the initial output driver from the driven device and changing the output speed of the gear box by engaging a changed output driver, which is an output driver of the gear box other than the initial output driver, to a driven device which may be the initial driven device or another device to be driven, to drive the engaged device at the changed output speed corresponding to the changed output driver.

The method may include using a coupling to connect the output driver to the driven device, where the coupling defines an input end configured to engage the selected output driver. Multiple couplings may be used, for example, including a first coupling having an input end configured to interface with the initial output driver, and a second coupling having an input end configured to interface with the changed output driver. The multiple output drivers may be differentiated from each other by configuration, labeling, marking, etc., to distinguish the output drivers from each other. The multiple couplings may be differentiated from each other by configuration, labeling, marking, etc., to distinguish the output drivers from each other. Differentiation of the output drivers and couplings provides a mistake-proofing mechanism to facilitate engagement of the driven device to the appropriate output driver corresponding to the selected output speed.

The above features and other features and advantages of the present invention are readily apparent from the following detailed description of the best modes for carrying out the invention when taken in connection with the accompanying drawings.

DETAILED DESCRIPTION

Figure 1:
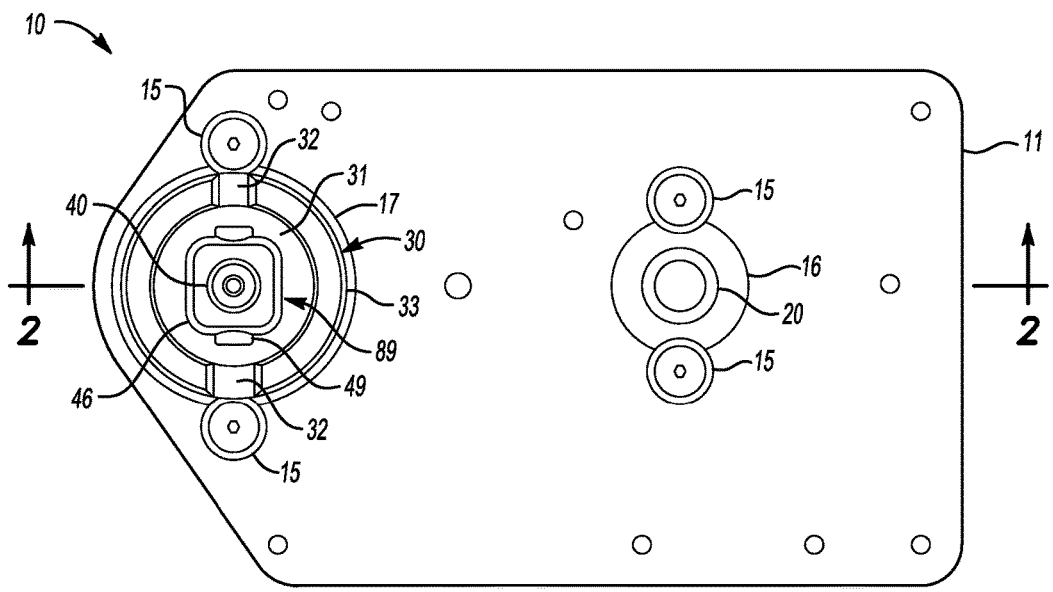
FIG. 1 is a schematic perspective front view of a multiple speed gear box.
Figure 2:
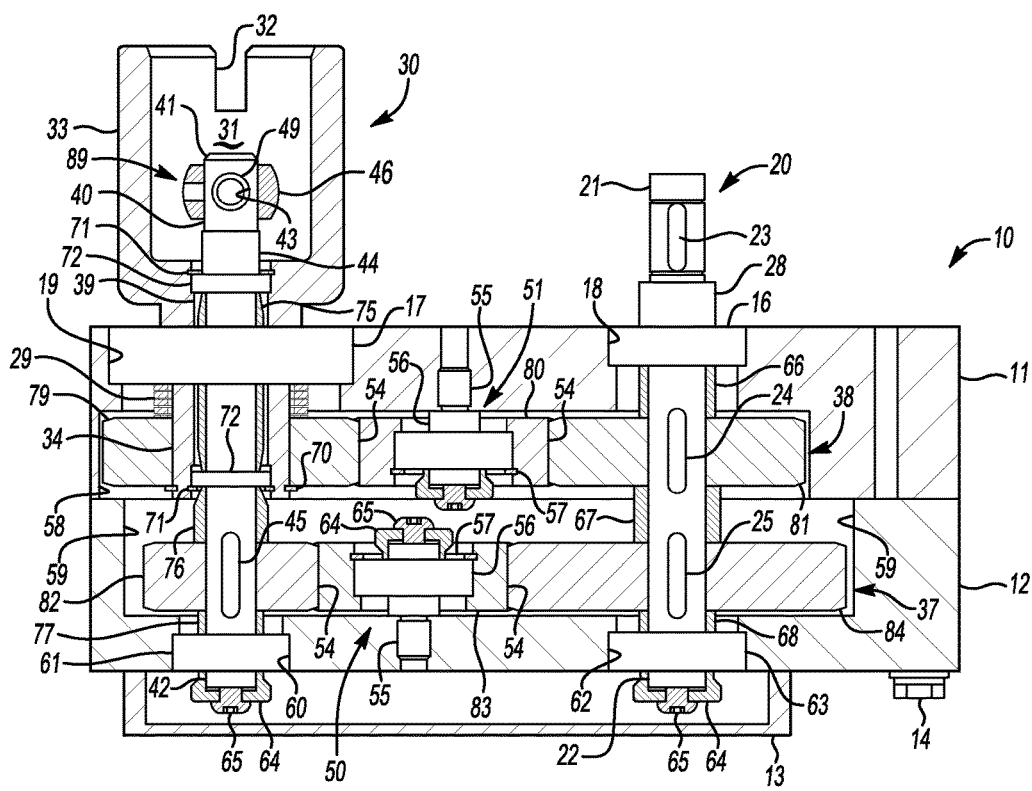
FIG. 2 is a schematic cross-sectional view of section 2-2 of the gear box of FIG. 1.

Referring to the drawings wherein like reference numbers represent like components throughout the several figures, the elements shown in FIGS. 1-6 are not necessarily to scale or proportion. Accordingly, the particular dimensions and applications provided in the drawings presented herein are not to be considered limiting. Referring to FIGS. 1 and 2, shown is a gear box generally indicated at 10. The gear box 10 includes an output shaft 40 including a first output driver generally indicated at 89 and a second output driver generally indicated at 30, which in use rotate concurrently with the output shaft 40 about a common axis 27 (see FIGS. 3-4) in response to a driving input received through an input shaft 20. The input shaft 20 includes a first end 21 configured to receive the driving input, which may be configured as a driving source (not shown) such as a motor, to rotatably drive the input shaft 20 at an input speed defined by the driving input. In the non-limiting example shown, the first end 21 of the input shaft 20 includes a key slot 23 for rotatably engaging the driver source. The example of a key slot 23 is intended to be non-limiting and it is understood the first end 21 may be otherwise configured to receive the driving input.

Figure 3:
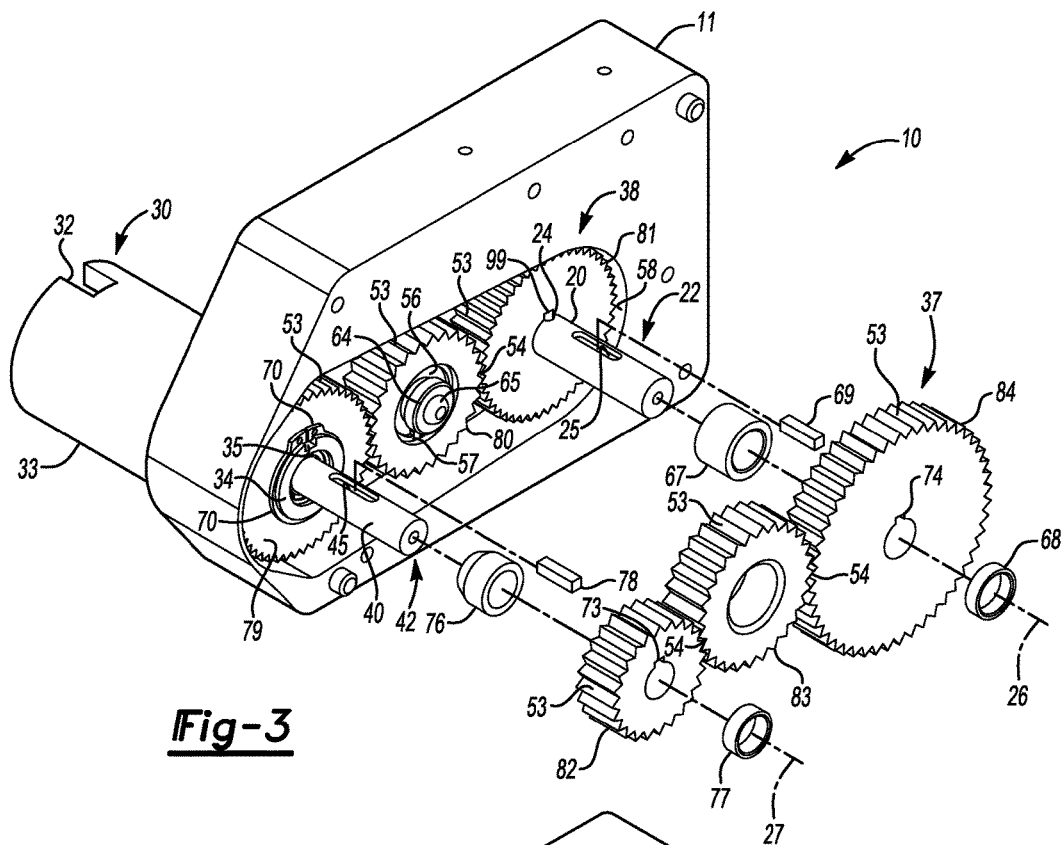
FIG. 3 is a schematic perspective exploded rear partial view of the gear box of FIG. 1.
Figure 4:
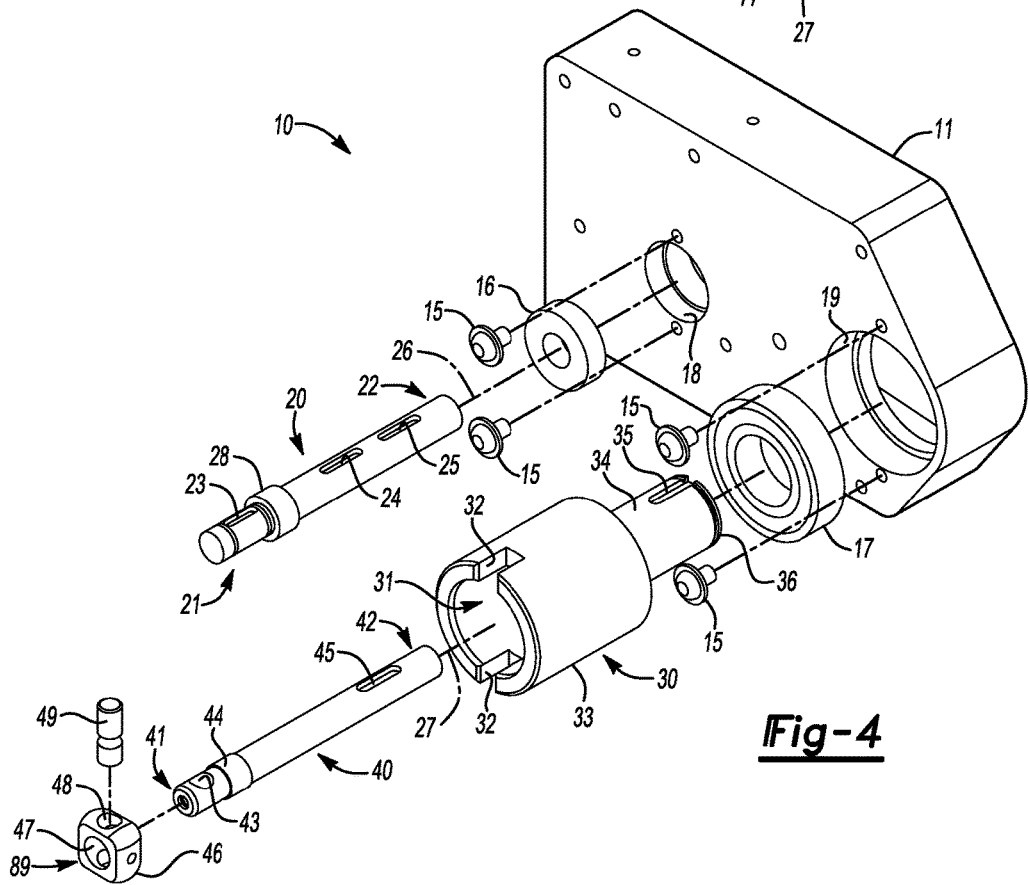
FIG. 4 is a schematic perspective exploded front partial view of the gear box of FIG. 1.

In the example shown, the gear box 10 includes a first gear set generally indicated at 37, and a second gear set generally indicated at 38. The first and second gear sets 37, 38 each include, as shown in FIGS. 2-3, a respective driven gear 82, 79, a respective driving gear 84, 81, and a respective idler gear 83, 80. In the non-limiting example shown, each of the gears 79-84 is configured as a spur gear having the same diametral pitch. Otherwise stated, each of the gears 79-84 is characterized by a module which is equivalent to the module of each of the other gears 79-84. Each gear 79-84 defines a plurality of teeth generally indicated at 53. Each gear 79-84 defines a tooth count determined by the total number of teeth on the respective gear. In the example shown, at least one of the gears 79-84 may have a tooth count different from another of the gears 79-84 such that a first gear ratio defined by the first gear set 37 may be different than a second gear ratio defined by the second gear set 38. The input shaft 20 is operatively attached to each of the driving gears 84, 81 to operate as a common input shaft 20 to the plurality of gear sets 37, 38 and such that the driving gears 84, 81 and the input shaft 20 share a common axis of rotation 26 as shown in FIGS. 3-4.

Each of the plurality of output drivers 89, 30 is operatively attached to the output shaft 40. The first output driver 89 is fixedly attached to the output shaft 40 and rotatably engaged via the output shaft 40 with the first gear set 37. The second output driver 30 is rotatably attached to, e.g., journaled for rotation relative to, the output shaft 40 and rotatably engaged with the second gear set 38. The output drivers 89, 30 and the output shaft 40 share a common axis of rotation 27 as shown in FIGS. 3-4. The input shaft 20 and output shaft 40 are in fixed arrangement relative to each other such that the shafts 20, 40 and the axes 26, 27 of the input and output shafts 20, 40 are parallel to each other.

Each gear 79-84 of the plurality of gear sets 37, 38 is characterized by an identical diametral pitch, e.g., the diametral pitch of each of the driven gears 82, 79, driving gears 84, 81, and idler gears 83, 80 in the gear box 10 is the same. In use, e.g., during rotation of the input shaft 20, each idler gear 83, 80 is continuously engaged with its respective driven gear 82, 79 and its respective driving gear 84, 81 within its respective gear set 37, 38 such that in use both gear sets 37, 38 are in continuous engagement with all gears 79-84 concurrently rotating. The first gear set 37 is characterized by a first gear ratio defined by the relationship between the tooth counts of the first driving and first driven gears 84, 82, such that the first driver 89 rotates at a first output speed determined by the first gear ratio of the first gear set 37 and the input speed at which the input shaft 20 is rotated in use. The second gear set 38 is characterized by a second gear ratio defined by the relationship between the tooth counts of the second driving and second driven gears 81, 79 of the second gear set 38, such that the second driver 30 rotates at a second output speed determined by the second gear ratio of the second gear set 38 and the input speed at which the input shaft 20 is rotated in use.

The tooth count of the various gears 79-84 may be different such that the first gear ratio defined by the first gear set 37 may be different than the second gear ratio defined by the second gear set 38. In use, both gear sets 37, 38 are driven at the same input speed by the common input shaft 20. By differing the first gear ratio and second gear ratio, the first output driver 89 and the second output driver 30 may be driven at different speeds by the common input shaft 20, such that the first output speed of the first output driver 89 differs from the second output speed of the second output driver 30. The ratio of the first and second output speeds is defined by the first gear ratio and the second gear ratio. In one example, the ratio of the output speeds is fixed as 2:1. It would be understood that the gear box 10 may be configured with different combinations of driving, driven and idler gears 79-84 such that other ratios of output speeds of the drivers 89, 30 may be provided by the gear box 10.

A driven device (not shown) may be selectively connected to a driver 89, 30 of the output shaft 40 such that the driven device may be rotatably driven by the gear box 10. For example, the driven device, also referred to herein as the device, may be configured as or include a timing screw, feed screw, or in-feed worm, or other device included in a material handling system, conveyor system or other system where the driven speed of the device may be controlled by the output speed of a gear box, such as the gear box 10, selectively connected to and driving the device. The output speed at which the device is driven by the gear box 10 may be changed from one output speed, which may be referred to herein as the initial speed, to another output speed, which may be referred to herein as the changed speed, by disconnecting the one of the output drivers 89, 30 from a driven device and reconnecting the other one of the output drivers 89, 30 to a driven device, such that the output speed of the gear box 10 may be changed without having to disengage and/or change out any of the gears 79-84 in the gear box 10. The gear sets 37, 38 may be enclosed by or sealed in a gear box housing which may be configured, for example, to include gear set housings 11, 12 shown in FIGS. 2 and 5-6, such that the output speed of the gear 10 box may be changed without opening the housing, thereby preventing contamination, incidental damage, and/or misalignment of the plurality of gear sets 37, 38 during changeover of the output speed of the gear box 10.

The driven device (not shown) may be connected directly to the gear box 10 via a device input (not shown) defined by, included in or coupled to the driven device and configured to interface with at least one of the drivers 89, 30. The driven device input (not shown) may be configured to be connectable to a selected one of the drivers 89, 30 but not connectable to the other one of the drivers 89, 30, for example, where it is desired that the driven device be driven only at an output speed corresponding to the selected one of the drivers 89, 30. Differentiation of the driver interfaces of the first and second drivers 89, 30 provides a mistake-proofing mechanism to ensure connection of the driven device to the selected one of the drivers 89, 30. In the example shown, the first driver 89 defines a first driver interface including a cross pin 49 and square drive 46, thus differentiating the first driver 89 from the second driver 30 which defines a second driver interface including a hollow portion 33 defining a cavity 31 and one or more slots 32.

Figure 5:
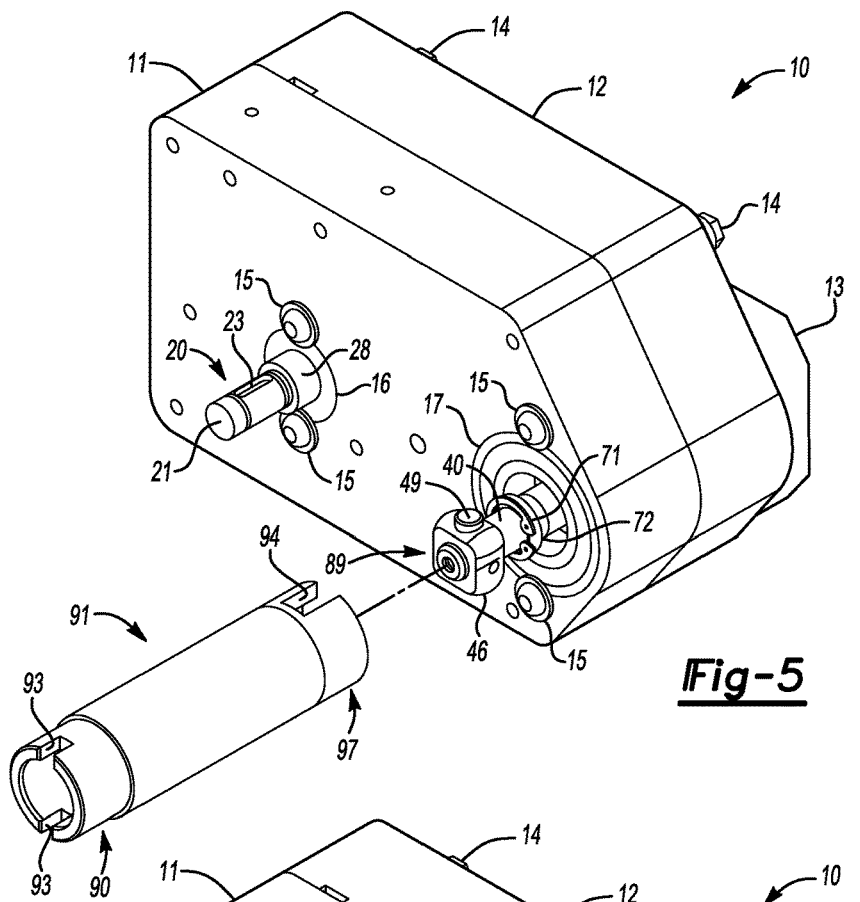
FIG. 5 is a schematic perspective front view of the gear box of FIG. 1 with the second driver removed from the illustration to show the first driver and a corresponding coupling.
Figure 6:
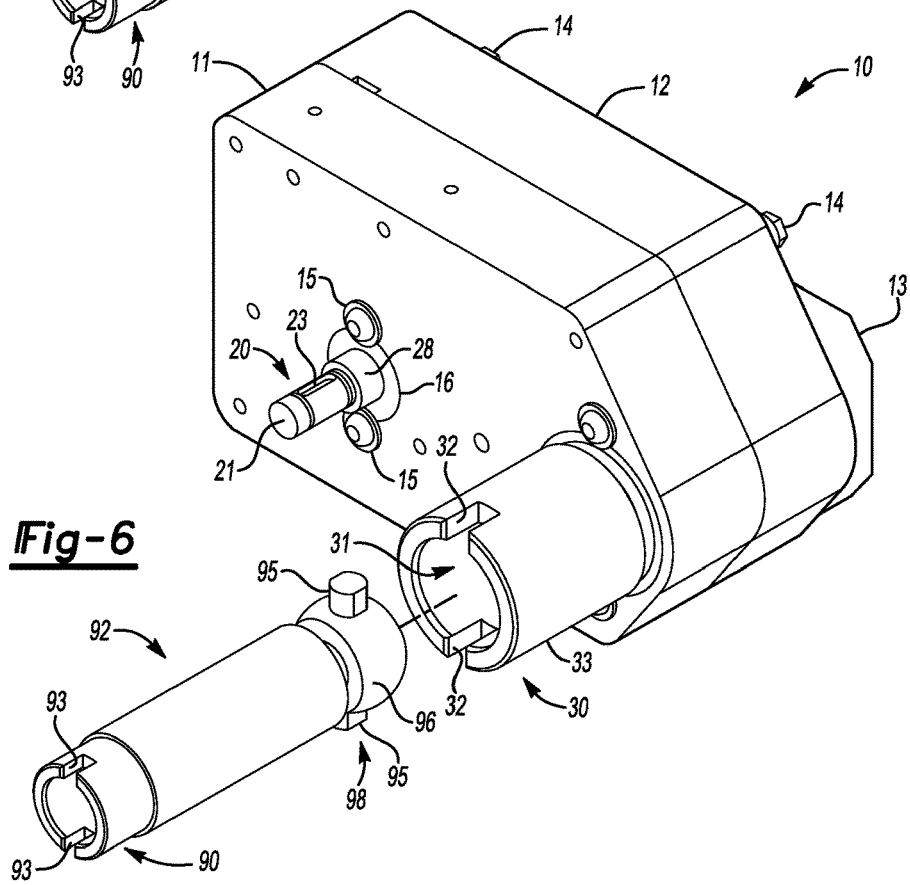
FIG. 6 is a schematic perspective front view of the gear box of FIG. 1 showing the second driver and a corresponding coupling.

As shown in FIGS. 5-6, the driven device may be connected via a coupling such as a coupling 91, 92 having an output end 90 configured to receive and/or be selectively connected to a device input defined by the driven device, and an input end 97, 98 configured to interface with a respective gear box driver 89, 30. In the example shown, the output end 90 defines a slotted driving interface 93 for connection to the device input of the driven device (not shown). It would be understood that other configurations of the output end 90 of the coupling 91, 92 to receive various possible configurations the driven device input are possible and the example shown in the figures is illustrative and not intended to be limiting. The input ends 97, 98 of the respective couplings 91, 92 maybe differentiated as shown, such that each coupling 91, 92 is connectable to a selected one of the drivers 89, 30, and not connectable to the other of the drivers 89, 30. In use, the first coupling 91 may be used to operatively connect the driven device to the first output driver 89, such that the driven device may be driven by the gear box 10 at a first output speed corresponding to the first output driver 89. Similarly, the second coupling 92 may be used to operatively connect the driven device to the second output driver 30, such that the driven device may be driven by the gear box 10 at a second output speed corresponding to the second output driver 30.

Differentiation of the respective input ends 97, 98 of each coupling 91, 92 provides a mistake-proofing mechanism to control connection of the driven device to a selected output driver 89, 30 of the gearbox 10. In the example shown, the input end 97 of the first coupling 91 includes a slotted hollow interface 94 configured to receive the cross pin 95 of the output driver 89, differentiating the input end 97 of the first coupling 91 from the input end 98 of the second coupling 92, which defines an interface 96 including the cross pin 95. In use, the first coupling 91 is connectable to the first driver 89 and not connectable to the second driver 30, such that the first coupling 91 must be used when using the gear box 10 to drive the driven device at the first output speed corresponding to the first driver 89. In use, the second coupling 92 is connectable to the second driver 30 and not connectable to the first driver 89, such that the second coupling 92 must be used when using the gear box 10 to drive the driven device at the second output speed corresponding to the second driver 30. The first and second couplings 91, 92 may be further differentiated from each other in use by color coding, marking or labeling (not shown) each of the couplings 91, 92 to identify each with the output speed provided by the respective driver 89, 30 to which the respective coupling 91, 92 is connectable.

Referring again to FIGS. 1-4, the gearbox 10 is described in further detail. In the example shown, the gear box 10 includes gear set housings 11, 12, which may be attached to each other using, for example, one or more fasteners 14 such that the gear set housings 11, 12 enclose the first and second gear sets 37, 38. For illustrative purposes, the gear set housing 11 may be referred to herein as the front housing through which the first end 21 of the input shaft 20 and the first end 41 of the output shaft 40 including the first and second drivers 89, 30 protrudes. Likewise, the gear set housing 12 may be referred to herein as the rear housing, to which the second ends 22, 42 of the input and output shafts 20, 40 are respectively retained, for example, by shaft bearings 63, 61, bearing retainers 64 and fasteners 65. A cover 13 may removably attached to the rear housing 12 to enclose the components protruding from the rear housing 12 and to prevent ingression of contaminants into the gear box 10 through the bearing pockets 60, 62 defined by the rear housing 12.

The rear housing 12 defines a gear pocket 59 configured to receive the first gear set 37, including a driving gear 84, a idler gear 83 and a driven gear 82. As shown in FIG. 2, an idler gear assembly 50 including the idler gear 83 and a gear hub 56 operatively attached to the idler gear 83 by a fastener 57 which may be a circlip, a snap ring, or the like, is rotatably connected to the rear housing 12 via a bearing 55, a bearing retainer 64 and a fastener 65. The rear housing 12 includes a bearing pocket 62 containing the rear input shaft bearing 63, and a bearing pocket 60 containing the rear output shaft bearing 61.

The front housing 11 defines a gear pocket 58 configured to receive the second gear set 38, including a driving gear 81, an idler gear 80 and a driven gear 79. As shown in FIG. 2, an idler gear assembly 51 including the idler gear 80 and a gear hub 56 operatively attached to the idler gear 80 by a fastener 57, is rotatably connected to the front housing 11 via a bearing 55, a bearing retainer 64 and a fastener 65. The front housing 12 includes a bearing pocket 18 retaining a front input shaft bearing 16, and a bearing pocket 19 retaining a driver hub bearing 17.

The bearings 16, 17, 61, 63 may be retained in their respective shaft bearing pockets by any suitable means, which may include press fitting the bearings 16, 17, 61, 63 to the bearing pockets 18, 19, 60, 62 and/or retaining the bearings 16, 17, 61, 63 relative to the housings 11, 12 using fasteners 15, as shown in FIGS. 1 and 4. The input shaft 20 extends through and is journaled for rotation in the front and rear shaft bearings 16, 63, and is fixed against axial movement in the gear box 10 by the bearing retainer 64 and a shoulder 28 on the input shaft 20. The output shaft 40 extends through and is journaled for rotation in hub bore bearings 72 and rear shaft bearing 61, and is fixed against axial movement in the gear box 10 by the bearing retainer 64 and a shoulder 44 on the output shaft 40. In the installed position, the longitudinal axis 26 of the input shaft 20 is parallel to the longitudinal axis 27 of the output shaft 40, such that in use, the input shaft 20 and the output shaft 40 rotate in parallel relative to each other.

The first gear set 37 is arranged as shown in FIGS. 2 and 3, such that in the installed position, the driving gear 84, idler gear 83 and driven gear 82 are constantly engaged via gear interfaces 54 defined by the teeth 53 meshed between the adjacent driving and idler gears 84, 83 and the teeth 53 meshed between the adjacent idler and driven gears 83, 82. In the example shown, the driving gear 84 is affixed to the input shaft 20 by a key 69 fitted to a keyway 74 defined by the bore of the driving gear 84 and a key slot 25 defined by the input shaft 20. The driven gear 82 is affixed to the output shaft 40 by a key 78 fitted to a keyway 73 defined by the bore of the driven gear 82 and a key slot 45 defined by the output shaft 40.

The first output driver 89 is defined by the first end 41 of the output shaft 40. As shown in FIGS. 1-2 and in FIG. 5, where gear box 10 is shown with the second driver 30 removed for illustrative purposes, the first output driver 89 may be defined, in a first example, by the first end 41 of the output shaft 40 defining a first driver interface which may include a hole 43 formed in the first end 41, where the hole 43 may be configured to receive a cross pin 49 or be otherwise connected to a device input (not shown). In a second example of a first output driver defined by the output shaft 40, the hole 43 and cross pin 49 may be used to retain a drive element 46, such that the first driver interface of the first output driver 89 may be defined by the cross pin 49 and/or the drive element 46. The drive element 46, in the configuration shown, includes a first hole 47 configured to receive the first end 41 of the output shaft 40, and a second hole 48 configured to align with the hole 43 of the first end 41 to receive the cross pin 49. The cross pin 49 may be grooved or relieved to receive a locking pin (not shown) to retain the cross pin 49 in position relative to the first end 41 and/or the drive element 46. The drive element 46 is shown in FIGS. 1, 2 and 5 configured as a square drive or square spherical drive in a non-limiting example and it is understood that other configurations of a drive element 46 may be used. A device input (not shown) of a device to be driven by the gear box 10 may be received by the first output driver 89 configured to rotatably engage the device input such that the device may be driven by the first output driver 89. In an example shown in FIG. 5, the device input may include a coupling 91 having an input end 97 defining a coupling interface 94 configured to engage the first output driver 89, and an output end 90 defining a device interface 93 configured to engage the device, such that the first output driver 89 may rotatably drive the driven device via the coupling 91.

The first output driver 89 is configured such that in use the first output driver 89 rotates about the axis 27 of the output shaft 40, and is rotated by the output shaft 40, which is driven by the input shaft 20 and first gear set 37. During rotation of the input shaft 20, the first gear set 37 remains in constant engagement and the first gear set 37, the output shaft 40 and the first output driver 89 are continuously rotating, with the first output driver 89 rotating at a first output speed corresponding to the first gear ratio defined by the first gear set 37, and defined by the first gear ratio and the input speed at which the input shaft 20 is rotating.

The second gear set 38 is arranged as shown in FIGS. 2 and 3, such that in the installed position, the driving gear 81, idler gear 80 and driven gear 79 are constantly engaged via gear interfaces 54 defined by the teeth 53 meshed between the adjacent driving and idler gears 81, 80 and the teeth 53 meshed between the adjacent idler and driven gears 80, 79. In the example shown, the driving gear 81 is affixed to the input shaft 20 by a key (not shown) fitted to a keyway 99 defined by the bore of the driving gear 81 and a key slot 24 defined by the input shaft 20. The driven gear 79 is affixed to the second output driver 30 by a key (not shown) fitted to a keyway (not shown) defined by the bore of the driven gear 79 and a key slot 35 (see FIG. 4) defined by a hub portion 34 of the output shaft 40, where the key (not shown) may be fixed against axial movement and/or retained in the keyway of the driven gear 79 and the key slot 35 of the hub portion 34 by a generally annular bearing 72 retained in the hub bore 39 by a fastener 71, which may be configured, for example, as a circlip or snap ring.

In the example shown, the second output driver 30 includes the hub portion 34 and a cup portion 33 defining a second driver interface. The hub portion 34 may be generally cylindrical, and as described previously, defines a hub bore 39 including a key slot 35. The cup portion 33 may be generally cylindrical and defines a cavity 31 in communication with the hub bore 39, where the hub bore 39 and the cavity 31 are configured such that the output shaft 40 is extendable through the hub bore 39 and into the cavity 31. In the example shown, the cup portion 33 defines a second driver interface configured to receive a device input (not shown) of a driven device and to rotatably engage the device input such that the device may be driven by the second output driver 30. In the example shown, the cup portion 33 of the second output driver 30 defines at least one slot 32, which may be configured to receive a device input of a device to be driven by the gear box 10.

Referring now to the example shown in FIG. 6, the device input may include a coupling 92 having an input end 98 configured to engage the first output driver 30, and an output end 90 defining a device interface 93 configured to engage the device to be driven by the gearbox 10, such that the second output driver 30 may rotatably drive the driven device via the coupling 92. In the example shown, the input end 98 includes a cross pin 95 and a ball end 96 configured to interface with the slots 32 and cavity 31 of the second output driver 30. The example is intended to be non-limiting, and other interfacing configurations of the second output driver 30 and the input end 98 may be used.

As shown in FIGS. 2-4, the second output driver 30 is journaled for rotation in the driver hub bearing 17 and on the hub bore bearings 72 such that axis of rotation of the second output driver 30 is coincident with the axis 27 of the output shaft 40. The second output driver 30 is rotated by the second gear set 38, which is driven by the input shaft 20 in use. During rotation of the input shaft 20, the second gear set 38 remains in constant engagement and the second gear set 38 and the second output driver 30 are continuously rotating, with the second output driver 30 rotating at a second output speed corresponding to the second gear ratio defined by the second gear set 38, and defined by the second gear ratio and the input speed at which the input shaft 20 is rotating.

As shown in FIG. 2, both the output shaft 40 and the second output driver 30 are journaled for rotation relative to the hub bore bearings 72. Because the output shaft 40 is driven by the first gear set 37 and the second output driver 30 is concurrently driven by another gear set, e.g., the second gear set 38, the output shaft 40 and the second output driver 30 are concurrently rotatable by rotation of the input shaft 30 and relative to the hub bore bearings 72 at different output speeds. The output shaft 40 including the first output driver 89 rotates at a first output speed corresponding to the first gear ratio defined by the first gear set 37, and the second output driver 30 rotates at a second output speed corresponding to the second gear ratio defined by the second gear set 38.

The hub bore 39 may be configured as shown in FIG. 2 such that each of the hub bore bearings 72 are retained within the hub bore 39 by a respective fastener 71, which may be a circlip or snap ring fitted to a groove defined by the hub bore 39. The hub bore bearings 72 may be fixed against axial movement by the snap rings 71 and a bearing spacer 75, as shown in FIG. 2.

Referring again to FIGS. 2-3, the first and second driving gears 81, 84 may be positioned axially and fixed against axial movement relative to the input shaft 20 by a plurality of bearing spacers 66, 67, 68 interposed between the front and rear input shaft bearings 16, 63 and the first and second driving gears 81, 84, to align each of the first and second driving gears 81, 84 relative to the gear pockets 58, 59 and the respective adjacent idler gears 80, 83. The first driven gear 82 may be positioned axially and fixed against axial movement relative to the output shaft 40 by a plurality of bearing spacers 75, 76, 77 and the hub bore bearings 72 interposed between the output shaft shoulder 44 and the rear output shaft bearing 61 and the first driven gear 82, to align the first driven gear 82 relative to the gear pockets 58, 59 and the adjacent idler gear 83. The second driven gear 79 may be positioned axially and fixed against axial movement relative to the hub portion 34 of the second output driver 30 by a spacer 29, which may be a compressible spacer such as a wave spring interposed between the driver hub bearing 17 and the second driven gear 79, and a retainer 70, which may be a circlip or snap ring configured to engage an annular groove 38 defined by the hub portion 34 to axially retain the second driven gear 79 relative to the hub portion 34, to align the second driven gear 79 relative to the gear pockets 58, 59 and the adjacent idler gear 80.

The gear box 10 is configured such that input shaft 20 concurrently drives the first gear set 37 and the second gear set 38, such that the first gear set 37, second gear set 38, output shaft 40, first output driver 89 and second output driver 30 are concurrently rotated by rotation of the input shaft 20. Further, in use, e.g., during rotation of the input shaft 20, the first gear set 37 and the second gear set 38 are constantly engaged and continually rotating, such that a driven device is engageable to and may be driven by either of the first output driver 89 and the second output driver 30 without disengaging either of the first gear set 37 and the second gear set 38. The output speed of the gear box 10 driving a device may be changed from an initial output speed corresponding to an initial output driver engaged by the device by disengaging the device from the initial driver, which may be one of the first and second output drivers 89, 30, and engaging the other of the first and second output drivers 89, 30 to a device, to drive the engaged device at the changed speed, where the changed speed is the output speed corresponding to the other of the first and second output drivers 89, 30. Because the first and second gear sets 37, 38 and the first and second output drivers 89, 30 rotate continuously and concurrently in use, e.g., during rotation of the input shaft 20, the output speed of the gear box 10 may be changed without disengaging either of the first and second gear sets 37, 38. Advantages of this configuration include the ability to quickly changeover the output speed of the gear box 10 by disengaging from one of the output drivers 89, 30 and reengaging the other of the output drivers 89, 30, and without having to otherwise reconfigure the gear box 10. Other advantages of maintaining the gear sets 37, 38 in constant engagement include substantially eliminating the potential for gear misalignment due to disengagement and reengagement of gears in the gear set and/or substantially eliminating the potential for gear contamination and wear due to contaminant ingression into the gear set by accessing the gear sets for disengagement or gear changeover.

As shown in FIGS. 1, 2 and 4, the second output driver 30 is configured to enclose the first output driver 89, such that the first and second output drivers 89, 30 are each selectively connectable to a device input presented to the first end 41 of the output shaft 40. Because the first and second output drivers 89, 30 can be engaged from the same end 41 of the output shaft 40, the output speed of the gear box 10 may be changed from the first output speed to the second output speed without changing the orientation of the gear box 10 relative to the device being driven, facilitating quick changeover of the gearbox output speed. In the example shown, the first output driver 89 is contained within the cavity 31 defined by the cup portion 33 of the second output driver 30.

Further, it would be understood that the input shaft 20 may be driven in first direction of rotation, where the first direction may be designated as the forward direction for illustrative purposes, and the input shaft 20 may be driven in a second direction of rotation opposing the first direction, where the second direction may be designated as the reverse direction for illustrative purposes. The gear box 10 is configured such that driving the input shaft 20 in a forward direction will cause concurrent rotation of each of the output drivers 89, 30 in a direction corresponding to the forward direction, and driving the input shaft 20 in a reverse direction will cause concurrent rotation of each of the output drivers 89, 30 in a direction corresponding to the reverse direction. The gear box 10 can therefore be operated in forward and reverse without disengaging either of the gear sets 37, 38 and without otherwise reconfiguring elements and components of the gear box 10.

Other configurations of the gear box and output drivers are possible. For example, each gear set may include more than one idler gear. One gear set may include an even number of gears and the other gear set may include an odd number of gears, such that one of the output drivers is rotated in an opposite direction to the other of the output drivers. The gears 79-84 are shown configured as spur gears in FIGS. 2-5. In another example, the gears 79-84 may all be configured as helical gears. Other configurations of the output drivers 89, 30 are possible, such that each of the output drivers 89, 30 may define different interfaces configured to receive various configurations of device inputs. For example, the cup portion 33 of the second driver 30 may define a non-cylindrical second driver interface and/or cavity 31.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A gear box configured to drive a device selectively connected to the gearbox, the gear box comprising:
   an output shaft including a first output driver and a second output driver;
   wherein the first output driver is operatively attached to the output shaft and the second output driver is rotatably attached to the output shaft such that the first driver, second driver and output shaft have a common axis of rotation defined by the output shaft; and
   wherein the first output driver and the second output driver extend from a common side of the gear box.

2. The gear box of claim 1, further comprising:
   an input shaft configured to receive a driving input;
   wherein the input shaft in use concurrently:
      rotates the first output driver at a first output speed; and
      rotates the second output driver at a second output speed; and
   wherein the first output speed and the second output speed are not equal.

3. The gear box of claim 2, wherein the ratio of the first output speed and the second output speed is 2:1.

4. The gear box of claim 2, wherein:
   the input shaft includes a first end to receive the driving input; and
   the first end extends from the common side of the gear box.

5. The gear box of claim 2, wherein the input shaft and the output shaft are arranged in parallel.

6. The gear box of claim 2, wherein in use of the first and second output drivers are each configured to:
   rotate in a first direction corresponding to a first direction of rotation of the input shaft; and
   rotate in a second direction corresponding to a second direction of rotation of the input shaft;
   wherein the first direction of rotation is opposite the second direction of rotation.

7. The gear box of claim 1, wherein:
the first driver defines a first driver interface configured to receive a first device input;
the second driver defines a second driver interface configured to receive a second device input.

8. The gear box of claim 7, wherein the first driver interface is differentiated from the second driver interface such that at least one of:
the second driver input cannot receive the first device input; and
the first driver input cannot receive the second device input.

9. The gear box of claim 1, wherein the first output driver is contained within a cavity defined by the second output driver.

10. The gear box of claim 1, wherein:
the first output driver is configured as a cross pin driver; and
the second output driver is configured as a hollow driver.

11. The gear box of claim 1, further comprising:
a first gear set configured to operatively engage the input shaft and the output shaft;
a second gear set configured to operatively engage the input shaft and the second output driver;
wherein the first and second gear sets are concurrently rotatable by the input shaft;
wherein the first output driver is rotated at a first output speed defined by the first gear set and the second output driver is rotated at a second output speed defined by the second gear set; and
wherein the first output speed and the second output speed are not equal.

12. The gear box of claim 11, wherein the first gear set is continuously engaged and the second gear set is continuously engaged such that the gearbox can be engaged to drive the device at either of the first output speed and the second output speed without disengaging either of the first gear set and the second gear set.

13. The gear box of claim 11, wherein:
the first gear set includes a first driving gear operatively attached to the input shaft, a first driven gear operatively attached to the output shaft, and a first idler gear engaged with the first driving gear and the first driven gear; and
the second gear set includes a second driving gear operatively attached to the input shaft, a second driven gear operatively attached to the second output driver, and a second idler gear engaged with the second driving gear and the second driven gear.

14. The gear box of claim 13, wherein each of the first driven gear, the second driven gear, the first driving gear, the second driving gear, the first idler gear, and the second idler gear is characterized by the same diametral pitch.

15. The gear box of claim 11, wherein:
the first gear set defines a first tooth count;
the second gear set defines a second tooth count; and
the first tooth count and the second tooth count are not equal.

16. The gear box of claim 13, wherein:
the first gear set defines a first gear ratio;
the second gear set defines a second gear ratio; and
the first gear ratio and the second gear ratio are not equal.

17. A method for changing the output speed of a gearbox driving a device selectively connected to the gearbox from an initial output speed to a changed output speed, the method comprising:
providing a gear box including:
an input shaft configured to receive a driving input;
an output shaft including a first output driver and a second output driver;
wherein the first output driver is operatively attached to the output shaft and the second output driver is rotatably attached to the output shaft such that the first driver, second driver and output shaft have a common axis of rotation defined by the output shaft;
wherein the first and second drivers and the first and second plurality of gears are concurrently rotated in use by rotation of the input shaft; and
wherein the first output driver and the second output driver extend from a common side of the gear box;
disengaging an initial driver from the device;
wherein:
the initial driver is one of the first and second output drivers;
the initial output speed of the gearbox corresponds to the initial driver; and
selectively connecting the other of the first and second output drivers to the device to change the output speed of the gearbox from the initial output speed to a changed output speed corresponding to the other of the first and second output drivers.

18. The method of claim 17, wherein:
the input shaft includes a first end to receive the driving input; and
the first end extends from the common side of the gear box.

19. The method of claim 17, wherein the device is selectively connected to the gear box by a coupling, the method further comprising:
disengaging the initial driver from the device by disengaging a first coupling from the device and from the initial driver;
providing a second coupling configured to engage the device and the other of the first and second output drivers; and
selectively connecting the second coupling to the other of the first and second output drivers to change the output speed of the gearbox from the initial output speed to the changed output speed.

20. The method of claim 17, wherein:
the first output driver is configured to receive a first device input configured to be driven at a first output speed;
the second output driver is configured to receive a second device input driven at a second output speed;
wherein the first and second device inputs are defined by the device; and
the first output driver is differentiated from the second output driver such that at least one of:
the second output driver cannot receive the first device input; and
the first output driver cannot receive the second device input.

* * * * *